US012279125B2

(12) United States Patent
Hedman et al.

(10) Patent No.: US 12,279,125 B2
(45) Date of Patent: Apr. 15, 2025

(54) REGISTERED UE COUNT IN SLICE SERVICE AREA

(71) Applicant: Telefonaktiebolaget LM Ericsson (publ), Stockholm (SE)

(72) Inventors: Peter Hedman, Helsingborg (SE); George Foti, Dollard des Ormeaux (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 342 days.

(21) Appl. No.: 17/798,735

(22) PCT Filed: Feb. 10, 2021

(86) PCT No.: PCT/IB2021/051092
§ 371 (c)(1),
(2) Date: Aug. 10, 2022

(87) PCT Pub. No.: WO2021/161193
PCT Pub. Date: Aug. 19, 2021

(65) Prior Publication Data
US 2023/0084453 A1 Mar. 16, 2023

Related U.S. Application Data

(60) Provisional application No. 62/975,795, filed on Feb. 13, 2020.

(51) Int. Cl.
*H04W 16/10* (2009.01)
*H04W 60/00* (2009.01)
*H04W 84/04* (2009.01)
(52) U.S. Cl.
CPC ........... *H04W 16/10* (2013.01); *H04W 60/00* (2013.01); *H04W 84/042* (2013.01)

(58) Field of Classification Search
CPC .... H04W 16/10; H04W 60/00; H04W 84/042
See application file for complete search history.

(56) References Cited

U.S. PATENT DOCUMENTS

2019/0059067 A1* 2/2019 Lee .................. H04L 67/141
2019/0166647 A1* 5/2019 Velev ................. H04W 8/08
(Continued)

FOREIGN PATENT DOCUMENTS

WO 2019032968 A1 2/2019
WO 2021063981 A1 4/2021

OTHER PUBLICATIONS

Apple, "S2-2000932: Solution for Key Issue #1: Maximum number of UEs per Network Slice," 3GPP SA WG2 Meeting #136-AH, Jan. 13-17, 2020, Incheon, South Korea, 5 pages.
(Continued)

*Primary Examiner* — Kenneth T Lam
(74) *Attorney, Agent, or Firm* — Withrow & Terranova, PLLC

(57) ABSTRACT

Systems and methods are disclosed herein for counting registered User Equipments (UEs) in a network slice service area. In one embodiment, a method performed by an Access and Mobility Management Function (AMF) in a core network of a cellular communications system comprises receiving a registration request from a UE and, responsive to receiving the registration request from the UE, initiating a registration procedure and determining whether the registration request received from the UE is applicable for update of counting for a respective network slice to be used by the UE. The method further comprises sending, to a Network Function (NF) that maintains a count of a number of UEs that are using the respective network slice, a message that causes an update to the count of the number of UEs that are using the respective network slice.

18 Claims, 9 Drawing Sheets

(56) References Cited

U.S. PATENT DOCUMENTS

| | | | | |
|---|---|---|---|---|
| 2020/0092423 | A1* | 3/2020 | Qiao | H04W 80/10 |
| 2021/0168643 | A1* | 6/2021 | Yao | H04W 24/08 |
| 2021/0211974 | A1* | 7/2021 | Prabhakar | H04W 8/24 |
| 2021/0212010 | A1* | 7/2021 | Lee | H04W 8/02 |
| 2022/0248318 | A1* | 8/2022 | Qiao | H04W 60/04 |
| 2022/0256439 | A1* | 8/2022 | Casati | H04W 48/18 |
| 2022/0369207 | A1* | 11/2022 | Ianev | H04W 28/0231 |
| 2023/0319700 | A1* | 10/2023 | Prabhakar | H04W 8/12 |
| | | | | 455/432.1 |

OTHER PUBLICATIONS

Author Unknown, "Generic Network Slice Template," Permanent Reference Document NG. 116, Version 1.0, May 23, 2019, GSM Association, 60 pages.

Author Unknown, "Generic Network Slice Template," Permanent Reference Document NG. 116, Version 2.0, Oct. 16, 2019, GSM Association, 61 pages.

Author Unknown, "Technical Specification Group Services and System Aspects; System Architecture for the 5G System (5GS); Stage 2 (Release 16)," Technical Specification 23.501, Version 16.3.0, Dec. 2019, 3GPP Organizational Partners, 417 pages.

Author Unknown, "Technical Specification Group Services and System Aspects; Procedures for the 5G System (5GS); Stage 2 (Release 16)," Technical Specification 23.502, Version 16.3.0, Dec. 2019, 3GPP Organizational Partners, 558 pages.

Author Unknown, "Technical Specification Group Services and System Aspects; Study on enhancement of network slicing; Phase 2 (Release 17)," Technical Report 23.700-40, Version 0.3.0, Jan. 2020, 3GPP Organizational Partners, 62 pages.

Author Unknown, "Technical Specification Group Services and System Aspects; Management and orchestration; 5G Network Resource Model (NRM); Stage 2 and stage 3 (Release 16)," Technical Specification 28.541, Version 16.3.0, Dec. 2019, 3GPP Organizational Partners, 327 pages.

Author Unknown, "Technical Specification Group Services and System Aspects; Management and orchestration; 5G performance measurements (Release 16)," Technical Specification 28.552, Version 16.4.0, Dec. 2019, 3GPP Organizational Partners, 159 pages.

Author Unknown, "Technical Specification Group Core Network and Terminals; 5G System; Principles and Guidelines for Services Definition; Stage 3 (Release 16)," Technical Specification 29.501, Version 16.0.0, Jun. 2019, 3GPP Organizational Partners, 69 pages.

SA WG2, "SP-190931: New SID: Feasibility on Multimedia Priority Service (MPS) Phase 2, Stage 2," 3GPP TSG SA Meeting #85, Sep. 17-20, 2019, Newport Beach, California, 3 pages.

International Search Report and Written Opinion for International Patent Application No. PCT/EP2020/077292, mailed Dec. 14, 2020, 11 pages.

International Search Report and Written Opinion for International Patent Application No. PCT/IB2021/051092, mailed Apr. 29, 2021, 17 pages.

* cited by examiner

REGISTERED UE COUNT IN SLICE SERVICE AREA

RELATED APPLICATIONS

This application is a 35 U.S.C. § 371 national phase filing of International Application No. PCT/IB2021/051092, filed Feb. 10, 2021, which claims the benefit of provisional patent application Ser. No. 62/975,795, filed Feb. 13, 2020, the disclosures of which are hereby incorporated herein by reference in their entireties.

TECHNICAL FIELD

The present disclosure relates to relates to network slicing in a cellular communications system.

BACKGROUND

The Global System for Mobile Communications Association (GSMA) Permanent Reference Document (PRD) NG.116 V2.0 "Generic Network Slice Template, Version 2.0, 16 Oct. 2019" has quotas attached to the number of User Equipments (UEs) to be registered in a network slice and the number of Protocol Data Unit (PDU) sessions established for a network slice. The GSMA PRD is under development.

To that effect, the Third Generation Partnership Project (3GPP) has started to study the topic, and several solutions have been proposed in 3GPP Technical Report (TR) 23.700-40 V0.3.0, where either existing Network Functions (NFs) or new NFs are proposed to keep track of the count. All of these NFs counting the number of UEs registered in a network slice ignore the fact that a network slice has a service area. While the service area described in GSMA PRD NG.116 may be the same as the area where the network slice is defined to be valid (referred to as the "network slice availability area"), the area where the network slice is to be counted might not be the same, which is an ongoing discussion. Hence, the UE must be counted once when it registers in the area in which the counting is to be valid, e.g. network slice service area. Hence, there may be a one-to-one relationship between the network slice availability area and the network slice service area where counting is mandated, but this does not need to be the same for all slices. In certain instances, a network slice availability area may encompass several network slice service areas where counting is required in each of these network slice service areas.

FIG. 1 illustrates a case where a network slice availability area includes more than a single network slice service area where counting is required.

Existing solutions ignore the network slice service area and might assume that the network slice service area is always the same as the network slice availability area. As such, counting of the number of UEs (or PDU sessions, etc.) might be wrong if the network slice service area and the network slice availability area are not the same, e.g. if there are separate services areas for which the counting is to be applied or if the counting is only to be made in part of the overall network slice availability area.

Also, the handling of UE identity is associated to privacy concerns, i.e. often the UE identity should not be spread in the system.

SUMMARY

Systems and methods are disclosed herein for counting registered User Equipments (UEs) in a network slice service area. In one embodiment, a method performed by an Access and Mobility Management Function (AMF) in a core network of a cellular communications system comprises receiving a registration request from a UE and, responsive to receiving the registration request from the UE, initiating a registration procedure and determining whether the registration request received from the UE is applicable for update of counting for a respective network slice to be used by the UE. The method further comprises sending, to a Network Function (NF) that maintains a count of a number of UEs that are using the respective network slice, a message that causes an update to the count of the number of UEs that are using the respective network slice. In this manner, a flexible counting scheme is provided that is able to cater to different business models.

In one embodiment, determining whether the registration request received from the UE is applicable for update of the counting for the respective network slice to be used by the UE comprises determining whether the UE has already been counted with respect to the respective network slice.

In one embodiment, determining whether the registration request received from the UE is applicable for update of the counting for the respective network slice to be used by the UE comprises determining whether the UE is a new entrant to the cellular communications system, determining whether the UE is re-entering the cellular communications system after being in another cellular communications system where count per network slice is decreased in the other cellular communications system when a UE leaves the other cellular communications system, or determining whether the UE is registered in the cellular communications system but the network slice requested in the registration request is a new network slice for the UE.

In one embodiment, determining whether the registration request received from the UE is applicable for update of the counting for the respective network slice to be used by the UE comprises determining that the registration request received from the UE is applicable for update of the counting for the respective network slice to be used by the UE if the registration request is an Initial Registration request, determining that the registration request received from the UE is applicable for update of the counting for the respective network slice to be used by the UE if the UE is coming from an Evolved Packet System (EPS) where the cellular communications system is a Fifth Generation (5G) System (5GS), determining that the registration request received from the UE is applicable for update of the counting for the respective network slice to be used by the UE if the UE moved from an area of a same Public Land Mobile Network (PLMN), or determining that the registration request received from the UE is applicable for update of the counting for the respective network slice to be used by the UE if one or more network slices are added or removed in the registration request compared to a set of network slices available in a previously allowed set of network slices for the UE.

In one embodiment, the method further comprises obtaining a customer identity (ID) for the UE or for an applicable subscribed Single Network Slice Selection Assistance Information (S-NSSAI) associated with the respective network slice to be used by the UE, wherein the customer ID is comprised in the message sent to the NF.

In one embodiment, determining whether the registration request received from the UE is applicable for update of the counting for the respective network slice to be used by the UE comprises determining that the registration request received from the UE is applicable for update of the counting for the respective network slice to be used by the UE, and sending the message to the NF comprises sending the message to the NF responsive to determining that the registration request received from the UE is applicable for update of the counting for the respective network slice to be used by the UE. In one embodiment, the message sent to the NF that causes the update to the count of the number of UEs that are using the respective network slice comprises information that indicates the respective network slice to be used by the UE. In one embodiment, the information that indicates the respective network slice to be used by the UE comprises a Home Public Land Mobile Network (HPLMN) S-NSSAI value that is mapped to the respective network slice to be used by the UE. In one embodiment, the message further comprises information that indicates one or more old allowed network slices of the UE. In one embodiment, the information that indicates the one or more old allowed network slices of the UE comprises one or more HPLMN S-NSSAI values that are mapped to the one or more old allowed network slices of the UE, respectively. In one embodiment, the respective count for the number of UEs for the respective network slice is incremented responsive to: (a) the registration request received from the UE being applicable for update of counting for the respective network slice to be used by the UE and (b) the respective network slice to be used by the UE not being any one of the one or more old allowed network slices of the UE. In another embodiment, the respective count for the number of UEs for the respective network slice is incremented responsive to the registration request received from the UE being applicable for update of counting for the respective network slice to be used by the UE.

In one embodiment, the message further comprises information that indicates one or more old allowed network slices of the UE, and a respective count of a number of UEs for one of the one or more old allowed network slices of the UE is decremented if the one of the one or more old allowed network slices of the UE is not the same as any of one or more requested or newly allowed network slices to be used by the UE, wherein the one or more requested or newly allowed network slices to be used by the UE comprises the respective network slice to be used by the UE.

In one embodiment, the method further comprises providing, to the NF, information that indicates a location of the UE. In one embodiment, the information that indicates the location of the UE comprises information that indicates a current tracking area of the UE. In one embodiment, the method further comprises providing, to the NF, information that indicates an old location of the UE. In one embodiment, the information that indicates the old location of the UE comprises information that indicates an old registration area of the UE. In one embodiment, whether a count of the number of UEs using the respective network slice is either incremented or decremented based on the location of the UE and the old location of the UE. In one embodiment, the method further comprises receiving, from the NF, a list of candidate tracking areas for a new registration area without tracking areas from different network slice service areas.

In one embodiment, different customers are assigned different S-NSSAIs.

In one embodiment, different customers are assigned different IDs that are provided to the NF that performs the counting.

Corresponding embodiments of an AMF are also disclosed. In one embodiment, an AMF for a core network of a cellular communications system is adapted to receive a registration request from a UE and, responsive to receiving the registration request from the UE, initiate a registration procedure and determine whether the registration request received from the UE is applicable for update of counting for a respective network slice to be used by the UE. The AMF is further adapted to send, to an NF that maintains a count of a number of UEs that are using the respective network slice, a message that causes an update to the count of the number of UEs that are using the respective network slice.

In one embodiment, a network node that implements an AMF for a core network of a cellular communications system comprises processing circuitry configured to cause the network node to receive a registration request from a UE and, responsive to receiving the registration request from the UE, initiate a registration procedure and determine whether the registration request received from the UE is applicable for update of counting for a respective network slice to be used by the UE. The processing circuitry is further configured to cause the network node to send, to an NF that maintains a count of a number of UEs that are using the respective network slice, a message that causes an update to the count of the number of UEs that are using the respective network slice.

Embodiments of a method performed by an NF are also disclosed. In one embodiment, the method performed by the NF comprises receiving a message from an AMF, wherein the message comprises information that indicates a new network slice(s) to be used by a UE. The method further comprises updating a count(s) of a number of UEs that are using the new network slice(s) to be used by the UE.

In one embodiment, the information that indicates the new network slice(s) to be used by the UE comprises a requested Network Slice Selection Assistance Information (NSSAI(s)) or new allowed NSSAI(s).

In one embodiment, the message further comprises a customer ID for the UE or for an applicable subscribed S-NSSAI(s) associated with the new network slice(s) to be used by the UE.

In one embodiment, the information that indicates the new network slice(s) to be used by the UE comprises a HPLMN S-NSSAI value(s) that is mapped to the respective network slice(s) to be used by the UE.

In one embodiment, a registration request from the UE is applicable for update of counting for the respective network slice(s) to be used by the UE, and updating the count(s) of the number of UEs that are using the new network slice(s) to be used by the UE comprises incrementing the count(s) of the number of UEs that are using the new network slice(s) to be used by the UE.

In one embodiment, a registration request from the UE is applicable for update of counting for the respective network slice(s) to be used by the UE, and the message further comprises information that indicates one or more old allowed network slices of the UE. In one embodiment, the information that indicates the new network slice(s) to be used by the UE comprises a HPLMN S-NSSAI value(s) that is mapped to the respective network slice(s) to be used by the UE and the information that indicates one or more old allowed network slices of the UE comprises one or more HPLMN S-NSSAI values that are mapped to the one or more old allowed network slices of the UE, respectively. In one embodiment, updating the count of the number of UEs that are using the new network slice(s) to be used by the UE comprises incrementing the count of the number of UEs that are using the new network slice(s) to be used by the UE if the respective network slice(s) to be used by the UE is not the same network slice as any of the one or more old allowed network slices of the UE. In one embodiment, decrementing a count of a number of UEs for one of the one or more old allowed network slices of the UE if the one of the one or more old allowed network slices of the UE is not the same as any of the new network slice(s) to be used by the UE.

In one embodiment, the method further comprises receiving, from the AMF, information that indicates a location of the UE. In one embodiment, the method further comprises receiving, from the AMF, information that indicates an old location of the UE. In one embodiment, whether a count of the number of UEs using the respective network slice is either incremented or decremented based on the location of the UE and the old location of the UE. In one embodiment, the method further comprises sending, to the AMF, a list of candidate tracking areas for a new registration area without tracking areas from different network slice service areas.

In one embodiment, different customers are assigned different S-NSSAIS.

In one embodiment, different customers are assigned different IDs that are provided to the NF that performs the counting.

In one embodiment, the NF that performs the counting is an NF other than the AMF or a Network Slice Selection Function (NSSF). In one embodiment, the method further comprises determining whether an update of the counting of the new network slice(s) is needed for the UE, wherein updating the count(s) of the number of UEs that are using the new network slice(s) to be used by the UE is performed responsive to determining that an update of the counting of the new network slice(s) is needed for the UE. In one embodiment, determining whether an update of the counting of the new network slice(s) is needed for the UE comprises determining whether the UE has already been counted with respect to the new network slice(s). In another embodiment, determining whether an update of the counting of the new network slice(s) is needed for the UE comprises determining whether the UE is a new entrant to a respective cellular communications system, determining whether the UE is re-entering the respective cellular communications system after being in another cellular communications system where count per network slice is decreased in the other cellular communications system when a UE leaves the other cellular communications system, or determining whether the UE is registered in the respective cellular communications system but the network slice requested in the registration request is a new network slice for the UE. In another embodiment, determining whether an update of the counting of the new network slice(s) is needed for the UE comprises determining that an update of the counting of the new network slice(s) is needed for the UE if an associated registration request is an Initial Registration request, determining that an update of the counting of the new network slice(s) is needed for the UE if the UE is coming from an EPS where the respective cellular communications system is a 5GS, determining that an update of the counting of the new network slice(s) is needed for the UE if the UE moved from an area of a same PLMN, or determining that an update of the counting of the new network slice(s) is needed for the UE if one or more network slices are added or removed in an associated registration request compared to a set of network slices available in a previously allowed set of network slices for the UE.

In one embodiment, the NF that performs the counting is an NSSF.

Corresponding embodiments of an NF are also disclosed. In one embodiment, an NF is adapted to receive a message from an AMF, wherein the message comprises information that indicates a new network slice(s) to be used by a UE. The NF is further adapted to update a count(s) of a number of UEs that are using the new network slice(s) to be used by the UE.

In one embodiment, a network node that implements an NF comprises processing circuitry that is configured to cause the network node to receive a message from an AMF, wherein the message comprises information that indicates a new network slice(s) to be used by a UE. The processing circuitry is further configured to cause the network node to update a count(s) of a number of UEs that are using the new network slice(s) to be used by the UE.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
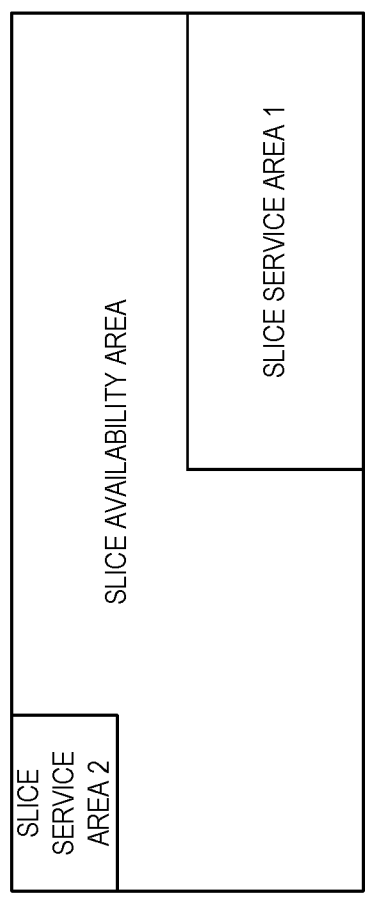
FIG. 1 illustrates a case where a network slice availability area includes more than a single network slice service area where counting is required.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc.

are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). All existing solutions proposed in

3GPP Technical Report (TR) 23.007-40 do not address the following issues:
1. NFs doing counting need to keep context per UE, which contradicts principles to not spread UE identity (ID) unless required, i.e. there is a need for solutions that avoid the use of the UE ID in the NF performing the counting.
2. The existing solutions cannot handle service areas for a network slice that differs compared to the defined network slice availability area.
3. The existing solutions cannot handle multiple service areas for a network slice, with each service area to be counted separately, which would be useful to avoid coordination across large network slices, e.g. covering a large country.
4. The existing solutions cannot handle network slices shared among multiple customers that require separate counting.

Certain aspects of the present disclosure and their embodiments may provide solutions to the aforementioned or other challenges. The following solution principles are proposed. Note that embodiments of the present disclosure may utilize any one or more (or all) of these principles. Further, for each principle, a number of aspects are described below. When using a principle, embodiments may include any one or more (or all) of the aspects described below for that principle.

A. Principle to avoid the need for UE ID in the NF performing the counting:
1. The AMF checks if the UE is a new entrant for counting for a network slice or is already registered and thereby counted for. In other words, upon receiving a registration request from a UE, the AMF checks whether the registration request received from the UE is applicable for update of counting for a network slice. This may occur when the UE is a new entrant to the 5G System (5GS) or when the UE is re-entering the 5GS after being in an Evolved Packet System (EPS) and the network decreases count per slice when the UE leaves to the EPS even if part of the EPS is using 5G Core (5GC) NFs. Also, this may occur when the UE is registered in the 5GS but requests a new network slice in the registration request. In such as case, the AMF checks, e.g., the previous allowed Network Slice Selection Assistance Information (NSSAI) from the UE context in the AMF (or retrieved from an old AMF if there is a mobility to a new AMF) and, if the UE added a new Single NSSAI (S-NSSAI) in the requested NSSAI, then the UE is a new entrant for counting as there may be a need to count the new slice/S-NSSAI. In one embodiment, the AMF can check if the UE is a new entrant for counting of a network slice as follows:

a. If a UE initiates an Initial Registration, then it is assumed that the UE is a new entrant and not already counted for (i.e., all S-NSSAIs requested by the UE and allowed are candidates for increasing the count per S-NSSAI).

b. If a UE comes from an EPS, then it is assumed that the UE counting has been decreased when leaving the 5GS, i.e. the UE is a new entrant (unless means have been developed to keep counting when a UE moves to an EPS and that is then taken into account). That is, all S-NSSAIs requested by the UE and allowed are candidates for increasing the count per S-NSSAI.

c. If a UE moved from an area of the same Public Land Mobile Network (PLMN) (e.g., UE 5G Global Unique Temporary Identifier (5G-GUTI) is of the same PLMN as the current PLMN), then the AMF assumes that the UE is already registered and old usage is counted for, if applicable, e.g. S-NSSAIs of the old allowed NSSAIs are part of a slice service area and have already been counted. Note that the AMF still provides relevant information to the NF doing the counting if needed due to other principles, e.g. to cater for areas as part of principle B.

d. The AMF issues a request to the NF performing the counting with the purpose to decrease the count for all valid S-NSSAIs of the UE (e.g., setting a new requested NSSAI to none or a new allowed NSSAI to none or indicating to decrease the old allowed NSSAI) for the following scenarios:
  i. When AMF receives a Namf_Communication_UEContextTransfer request from another AMF of a different PLMN and the transfer is confirmed by Namf_Communication_RegistrationCompleteNotify, then the AMF regards all registered S-NSSAIs valid for counting needs to be decreased.
  ii. When the UE de-registers in 5GS (then the count for all S-NSSAIs previously in the allowed NSSAI and valid for counting need to be decreased).
  iii. When the UE moves to another system (e.g., EPS) and the AMF receives Nudm_UECM_DeregistrationNotification service operation from the HSS/UDM, de-registering any old AMF for 3GPP access, or when the AMF acknowledges MME with a Relocation Complete Acknowledgement (Ack) message and the supervision timer in the AMF expires that controls the resource in the Next Generation (NG) RAN.

e. The AMF issues a request to the NF performing the counting with the purpose to increase or decrease the count of one or more S-NSSAIs when the UE adds or removes S-NSSAIs in the registration request compared to the S-NSSAIs available in the previously allowed NSSAI.

2. When the AMF initiates a message for counting a number of UEs, e.g. at a registration request (except Periodic Registration Update), the AMF provides the following information to the entity performing the count:
  a. the new network slices to be used by the UE, e.g. requested NSSAI or new allowed NSSAI, and in addition provides corresponding mapped Home PLMN (HPLMN)S-NSSAI values, and provides
  b. the old allowed NSSAI and corresponding mapped HPLMN S-NSSAI values. For new entrants, the AMF does not provide an old allowed NSSAI or set it to a value meaning new entrant.

3. The NF performing the counting compares the new and old S-NSSAIs and adjusts the counting accordingly:
  a. If an S-NSSAI is or is not part of both old and new information, then no action for the S-NSSAI,
  b. If an S-NSSAI is part of old but not new information, then the NF decreases the count for the S-NSSAI,
  c. If an S-NSSAI is part of new but not old information, then the NF increases the count for the S-NSSAI.

B. Principle to support network slice service areas for a network slice that differs compared to the defined network slice availability area and to support multiple service areas for a network slice, with each service area to be counted separately.

1. When the AMF initiates a message for the counting of a number of UEs, e.g. at a registration request (except Periodic Registration Update), the AMF provides:
  a. current location of the UE, e.g. current Tracking Area (TA), and old location of the UE in the form of the old Registration Area (RA).

2. The NF performing the counting compares the new and old values and adjusts the counting per S-NSSAI accordingly.
  a. If the UE's old area is outside of any area to be counted for, and the new area is inside a slice service area, then the counting for the slice service area is increased,
  b. If the UE's old area and the new area are inside the same slice service area, then no action for the S-NSSAI,
  c. If the UE's old area and the new area are inside different slice service areas, then the counting for the old slice service area is decreased and the counting for the new slice service area is increased.

3. To avoid the UE's RA spanning more than one slice service area, the AMF can be given the slice service areas such that the AMF can create a new RA without TAs from different slice service areas, e.g. options can be:
  a. The AMF gets the slice service areas that constitute the different slice service areas, e.g. from Operation and Maintenance (O&M), UDM, NSSF, or the NF that performs the counting, and the AMF uses it to avoid TAs from different slice service areas when creating a new RA for the UE, or
  b. The AMF gets the new candidate TAs that can be used for the new RA, e.g. from the NSSF or the NF performing the counting, and the AMF uses those TAs as candidate TAs for the new RA for the UE.

C. Principle to support network slices shared among multiple customers that require separate counting.
  1. Each customer (e.g., operator business partner) requiring a separate count is given its own S-NSSAI, i.e. such that multiple S-NSSAIs may refer to the same network slice instance (or different if a new network slice instance is created due to other reasons), or
  2. If a separate S-NSSAI cannot be used for each customer (e.g., not possible to separate per Slice Differentiator (SD) of an S-NSSAI (an S-NSSAI is built up of Slice Service Type (SST) and SD), then each customer is given a separate identity that is provided to the NF performing the counting, e.g. the customer ID is included in the UE's subscription in UDM and sent to the AMF that then sends it to the NF performing the counting. The NF performing the counting uses the customer ID to separate the counting per S-NSSAI.

Note after a UE deregistration or a network-initiated deregistration, all UE entries are removed.

In interworking scenarios, in the direction Evolved Packet Core (EPC) to 5GC, the UE registers in 5GC, then the algorithm would work as is.

In the direction 5GC to EPC, the network AMF will deregister the UE once it is notified by the UDM/HSS.

Certain embodiments may provide one or more of the following technical advantage(s). For example, embodiments disclosed herein may provide flexible counting that caters to different business models. As another example, embodiments disclosed herein may avoid the need to spread the UE ID in the system (i.e., as UE ID, e.g., Subscriber Permanent Identifier (SUPI) is not sent to the NF), also keeping the NF stateless from per UE context information. As another example, embodiments disclosed herein may enable counting per specific areas, e.g., to cater for different agreed density in rural areas and city centers, etc.

Figure 2:
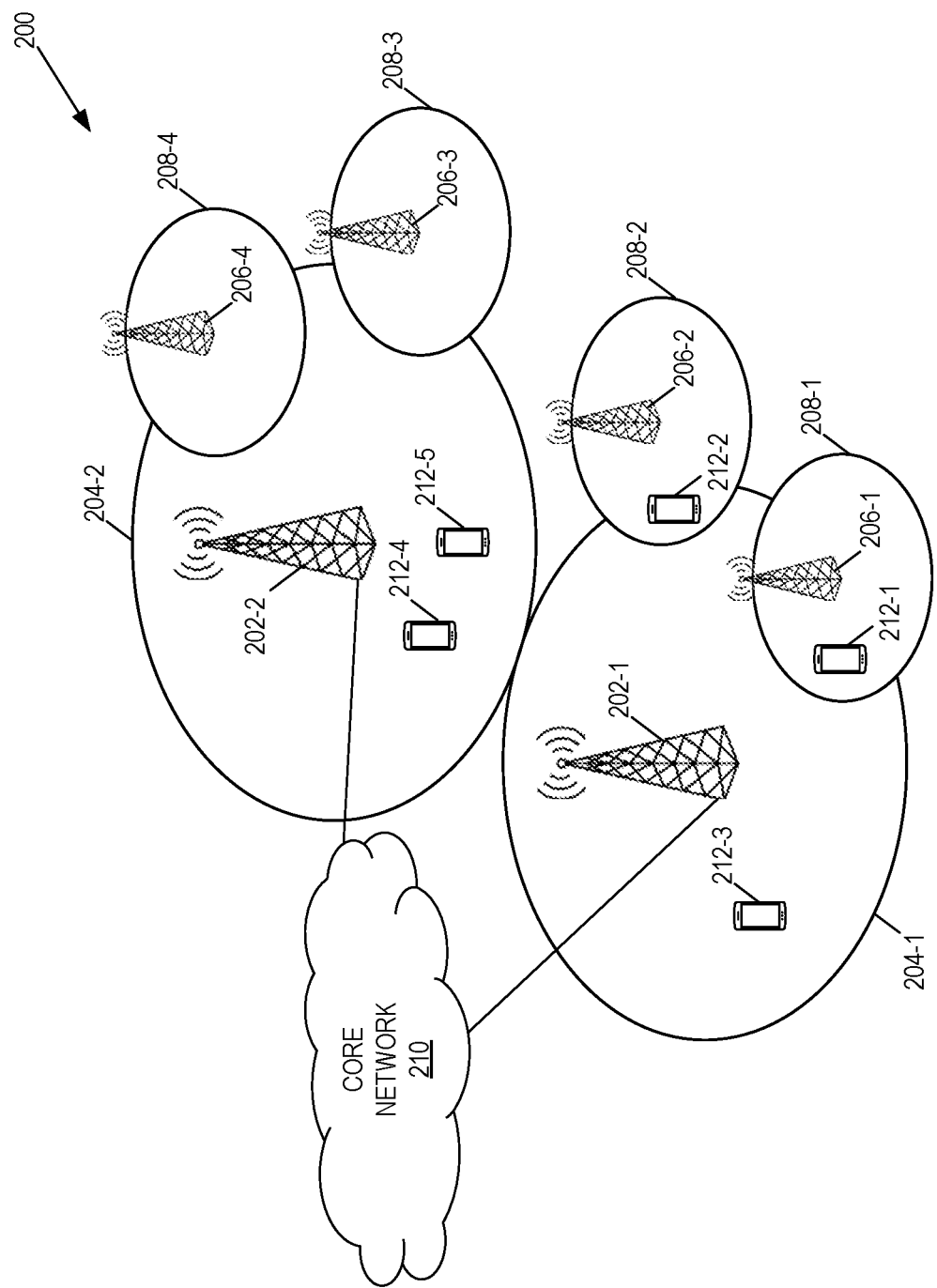
FIG. 2 illustrates one example of a cellular communications system in which embodiments of the present disclosure may be implemented.

FIG. 2 illustrates one example of a cellular communications system 200 in which embodiments of the present disclosure may be implemented. In the embodiments described herein, the cellular communications system 200 is a 5GS including a NG-RAN which includes gNBs and optionally ng-eNBs (i.e., LTE RAN nodes connected to 5GC). Alternatively, the cellular communications system 200 is an EPS including an Evolved Universal Terrestrial Radio Access Network (E-UTRAN) including eNBs (i.e., LTE RAN nodes). Still further, in some embodiments, the cellular communications system 200 may include both a 5GS and an EPS with interworking between the 5GS and the EPS. In this example, the RAN includes base stations 202-1 and 202-2, which in LTE are referred to as eNBs and in 5G NR are referred to as gNBs or ng-eNBs, controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as the 5GC. The base stations 202 (and optionally the low power nodes 206) are connected to the core network 210.

The base stations 202 and the low power nodes 206 provide service to wireless communication devices 212-1 through 212-5 in the corresponding cells 204 and 208. The wireless communication devices 212-1 through 212-5 are generally referred to herein collectively as wireless communication devices 212 and individually as wireless communication device 212. In the following description, the wireless communication devices 212 are oftentimes UEs, but the present disclosure is not limited thereto.

Figure 3:
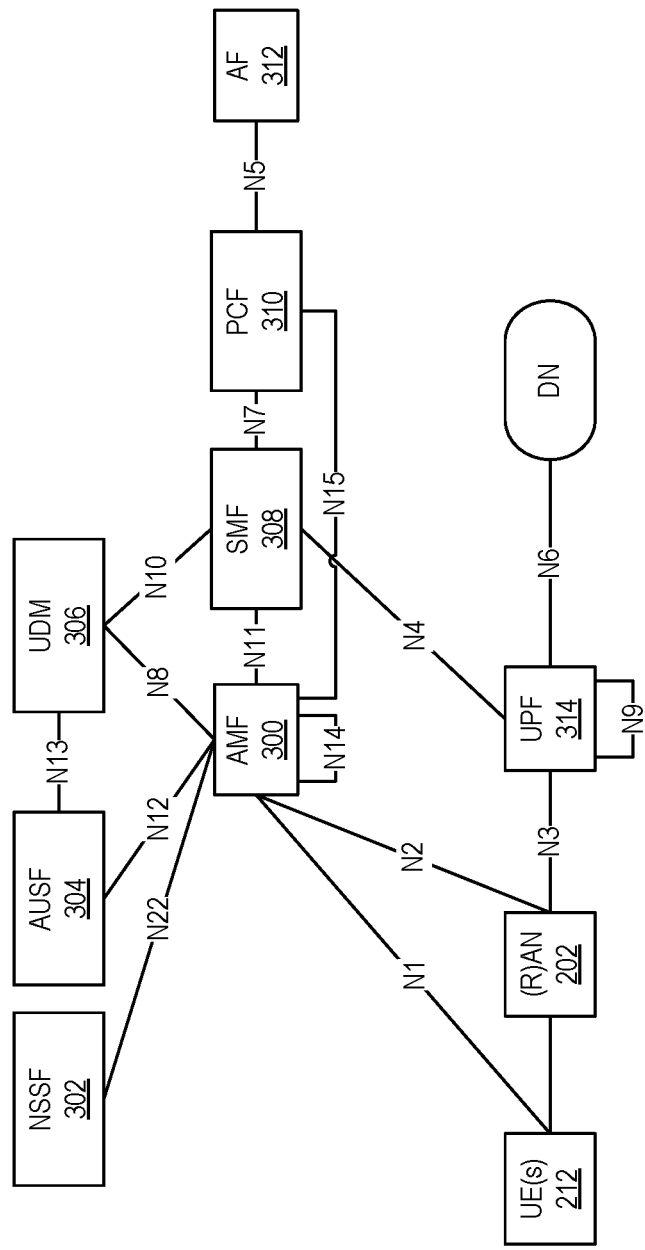
FIGS. 3 and 4 illustrate example embodiments of the cellular communications system of FIG. 2 in which the cellular communications system is a Fifth Generation (5G) System (5GS)

FIG. 3 illustrates a wireless communication system represented as a 5G network architecture composed of core NFs, where interaction between any two NFs is represented by a point-to-point reference point/interface. FIG. 3 can be viewed as one particular implementation of the system 200 of FIG. 2.

Seen from the access side the 5G network architecture shown in FIG. 3 comprises a plurality of UEs 212 connected to either a RAN 202 or an Access Network (AN) as well as an AMF 300. Typically, the R (AN) 202 comprises base stations, e.g. such as eNBs or gNBs or similar. Seen from the core network side, the 5GC NFs shown in FIG. 3 include an NSSF 302, an AUSF 304, a UDM 306, the AMF 300, an SMF 308, a PCF 310, and an Application Function (AF) 312.

Reference point representations of the 5G network architecture are used to develop detailed call flows in the normative standardization. The N1 reference point is defined to carry signaling between the UE 212 and AMF 300. The reference points for connecting between the AN 202 and AMF 300 and between the AN 202 and UPF 314 are defined as N2 and N3, respectively. There is a reference point, N11, between the AMF 300 and SMF 308, which implies that the SMF 308 is at least partly controlled by the AMF 300. N4 is used by the SMF 308 and UPF 314 so that the UPF 314 can be set using the control signal generated by the SMF 308, and the UPF 314 can report its state to the SMF 308. N9 is the reference point for the connection between different UPFs 314, and N14 is the reference point connecting between different AMFs 300, respectively. N15 and N7 are defined since the PCF 310 applies policy to the AMF 300 and SMF 308, respectively. N12 is required for the AMF 300 to perform authentication of the UE 212. N8 and N10 are defined because the subscription data of the UE 212 is required for the AMF 300 and SMF 308.

The 5GC network aims at separating user plane and control plane. The user plane carries user traffic while the control plane carries signaling in the network. In FIG. 3, the UPF 314 is in the user plane and all other NFs, i.e., the AMF 300, SMF 308, PCF 310, AF 312, NSSF 302, AUSF 304, and UDM 306, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 300 and SMF 308 are independent functions in the control plane. Separated AMF 300 and SMF 308 allow independent evolution and scaling. Other control plane functions like the PCF 310 and AUSF 304 can be separated as shown in FIG. 3. Modularized function design enables the 5GC network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 4:
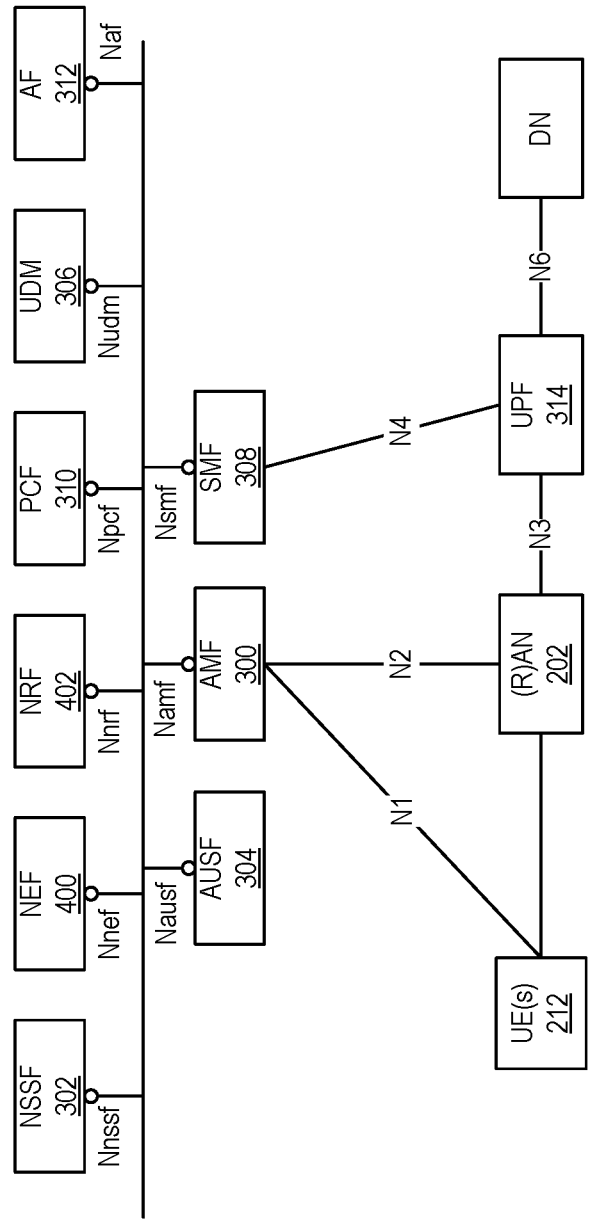

FIG. 4 illustrates a 5G network architecture using service-based interfaces between the NFs in the control plane, instead of the point-to-point reference points/interfaces used in the 5G network architecture of FIG. 3. However, the NFS described above with reference to FIG. 3 correspond to the NFs shown in FIG. 4. The service(s) etc. that an NF provides to other authorized NFs can be exposed to the authorized NFs through the service-based interface. In FIG. 4 the service based interfaces are indicated by the letter "N" followed by the name of the NF, e.g. Namf for the service based interface of the AMF 300 and Nsmf for the service based interface of the SMF 308, etc. The NEF 400 and the NRF 402 in FIG. 4 are not shown in FIG. 3 discussed above. However, it should be clarified that all NFs depicted in FIG. 3 can interact with the NEF 400 and the NRF 402 of FIG. 4 as necessary, though not explicitly indicated in FIG. 3.

Some properties of the NFs shown in FIGS. 3 and 4 may be described in the following manner. The AMF 300 provides UE-based authentication, authorization, mobility management, etc. A UE 212 even using multiple access technologies is basically connected to a single AMF 300 because the AMF 300 is independent of the access technologies. The SMF 308 is responsible for session management and allocates Internet Protocol (IP) addresses to UEs. It also selects and controls the UPF 314 for data transfer. If a UE 212 has multiple sessions, different SMFs 308 may be allocated to each session to manage them individually and possibly provide different functionalities per session. The AF 312 provides information on the packet flow to the PCF 310 responsible for policy control in order to support Quality of Service (QOS). Based on the information, the PCF 310 determines policies about mobility and session management to make the AMF 300 and SMF 308 operate properly. The AUSF 304 supports authentication function for UEs or similar and thus stores data for authentication of UEs or similar while the UDM 306 stores subscription data of the UE 212. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 5:
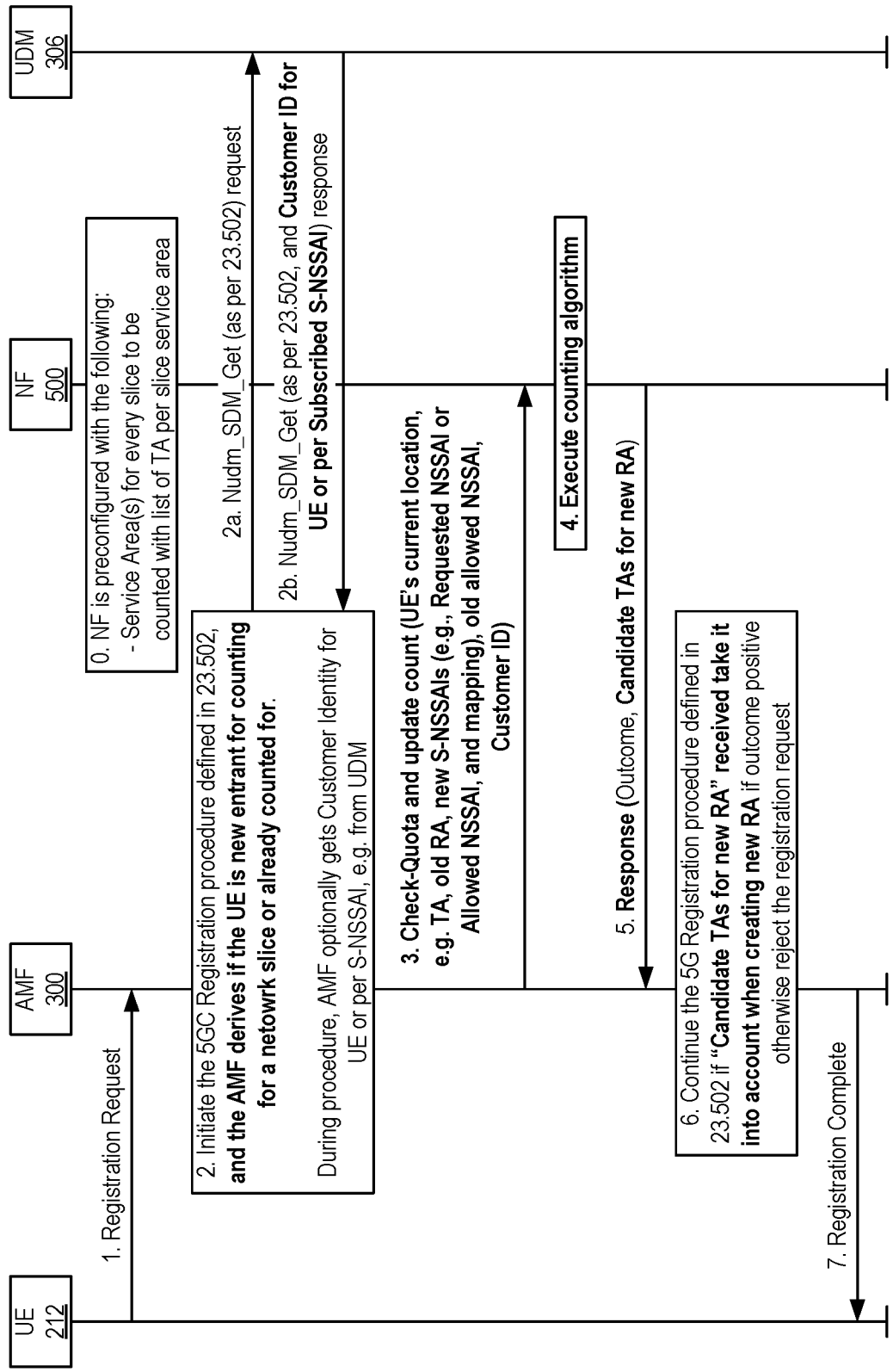
FIG. 5 illustrates the operation of a User Equipment (UE), Access and Mobility Management Function (AMF), and Network Function (NF) involved in counting the number of UEs for a network slice(s) in accordance with some embodiments of the present disclosure.

FIG. 5 illustrates the operation of a UE 212, AMF 300, and NF 500 involved in counting the number of UEs in accordance with some embodiments of the present disclosure. The procedure of FIG. 5 utilizes any NF performing the counting with a separate request for the counting from the AMF 300. The following is a description of the steps illustrated in FIG. 5.

Step 0: As a prerequisite, the NF 500 that performs counting is preconfigured with the network slice service area for every network slice to be counted including the list of TAs included in the network slice service area or per network slice service area (if there are multiple network slice service areas). While not illustrated, the NF 500 may retrieve the network slice availability area by using the Nnssf_NSSAIAvailability service. But, as long as the network slice service area is within the slice availability area, there may not be an immediate need for it.

Step 1: In step 1, the UE 212 initiates a registration towards the AMF 300.

Step 2: In step 2, the AMF 300 initiates the registration procedure as depicted in 3GPP Technical Specification (TS) 23.502 (see, e.g., V16.3.0). In addition, the AMF 300:

derives if the UE 212 is a new entrant for counting of a network slice or already counted for as per principles described in A(1) above;

may get the customer ID (one for the UE 212 or one per applicable subscribed S-NSSAI) from the UDM 306, e.g. as part of existing Nudm_SDM_Get response (see steps 2a and 2b).

Step 3: In step 3, the AMF 300 initiates a request towards the NF 500 to update the count and includes in the request the current TA where the UE 212 is currently located, the old RA, and new S-NSSAIs (e.g., requested NSSAI sent by the UE 212 or the new allowed NSSAI to be sent to the UE 212 and, if available, corresponding mapped HPLMN S-NSSAI values, the old allowed NSSAI, and customer ID (for the UE 212 or per S-NSSAI)). The old allowed NSSAI for the UE 212 is the allowed NSSAI for the UE 212 before the UE 212 sent the new registration request or a list of S-NSSAIs including a subset of the previously allowed NSSAIs. Note that, in general, allowed NSSAI refers to the S-NSSAIs applicable for the home network (e.g., HPLMN) while the AMF 300, and Visited PLMN (VPLMN), would use S-NSSAIs applicable for the VPLMN. If possible, the AMF 300 should be working with either or both types of S-NSSAIs. Depending on the selected NF 500 performing the count, some of these parameters may already be known and need not be included in the request (e.g., see procedure of FIG. 6). The AMF 300 may also check the quota in step 3, but this is optional. Note that, by having the AMF 300 check new changes per S-NSSAI, there is no need to send the message in step 3 for all requests, and the NF 500 will not miss to count, e.g., when UE the 212 adds or removes some slices in the requested NSSAI. Another option is to not check and push the information of step 3 to the NF 500 for all UE registration requests. Note that, in one alternative embodiment, the request of step 3 is initiated by the AMF 300 only after reaching a predefined or preconfigured quota. The quota may be any integer number greater than or equal to 1. So, upon determining that the count is to be updated, the AMF 300 will only send the request of step 3 if the quota of such determinations is reached.

Step 4: In step 4, the NF 500 performs the counting algorithm as described above in principles A, B, and C.

Step 5: In step 5, the NF 500 sends, to the AMF 300, a response including the outcome (as described in 3GPP TR 23.700-40 V0.3.0) and, in addition, optionally "Candidate TAs for new RA".

Step 6: In step 6, if received, the AMF 300 uses the "Candidate TAs for new RA" as input to derive a new RA (i.e., the AMF 300 does not include more TAs than provided in the list from the NF 500) and, depending on the outcome, the registration procedure is stopped (i.e., rejected) for a negative outcome or continued based on 3GPP TS 23.502.

Step 7: In step 7, the AMF 300 sends a message to the UE 212, which is either a registration accept or a registration reject.

Figure 6:
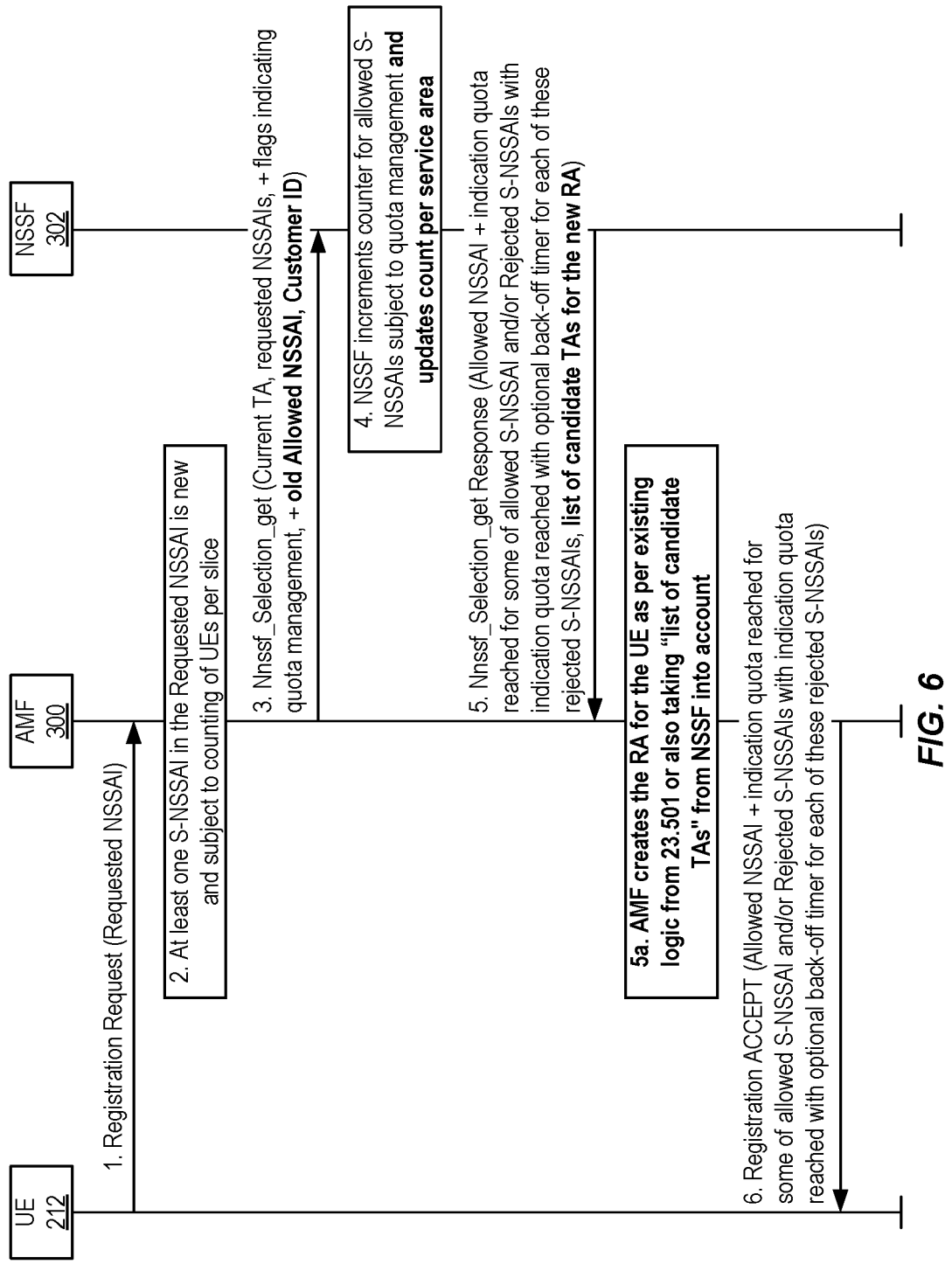
FIG. 6 illustrates the operation of a UE, AMF, and Network Slice Selection Function (NSSF) to perform counting in accordance with some other embodiments of the present disclosure.

FIG. 6 illustrates the operation of a UE 212, AMF 300, and NSSF 302 to perform counting in accordance with some other embodiments of the present disclosure. The procedure of FIG. 6 utilizes the NSSF 302 for performing the counting, and the request for counting is merged into the existing service request as per solution #3 in 3GPP TR 23.700. The steps of the procedure of FIG. 6 are described below.

Step 1: The UE 212 sends a Registration Request, including a requested NSSAI, to the AMF 300.

Step 2: For step 2, the AMF 300 performs the principles listed in A, B, and C.

Step 3: The AMF 300 sends, to the NSSF 302, a Nnssf_Selection_get message. In this example, this message includes current TA, requested NSSAIs, flags indicating quota management, old RA, old allowed NSSAI, and customer ID. New information is shown in FIG. 6 with bold font.

Step 4: The NSSF 302 increments a counter for allowed S-NSSAIs subject to quota management and updates count per service area. For step 4, the NSSF 302 uses the new information contained in the Nnssf_Selection_get message received from the AMF 300 in step 3 to know for which S-NSSAIs to increase or decrease the count and for which network slice service area. In step 4, the NSSF 302 performs the counting algorithm as described above in principles A, B, and C.

Step 5: The NSSF 302 sends, to the AMF 300, a Nnssf_Selection_get Response which, in this example, includes allowed NSSAI(s) plus an indication that a quota has been reached for some of the allowed S-NSSAI(s) and/or rejected S-NSSAI(s) with an indication that the quota has been reached with an optional back-off timer for each of these rejected S-NSSAIs, and a list of candidate TAs for the new RA. For step 5, the NSSF may provide a list of candidate TAs for the new RA.

Step 5a: The AMF 300 creates the RA for the UE 212 as per existing logic from 3GPP TS 23.501 and may also take into account the "list of candidate TAs" received from the NSSF 302. For step 5a, the AMF 300 may use the list of candidate TAs as input to selecting an appropriate RA for the UE 112.

Step 6: The AMF 300 sends a Registration Accept to the UE 112.

Figure 7:
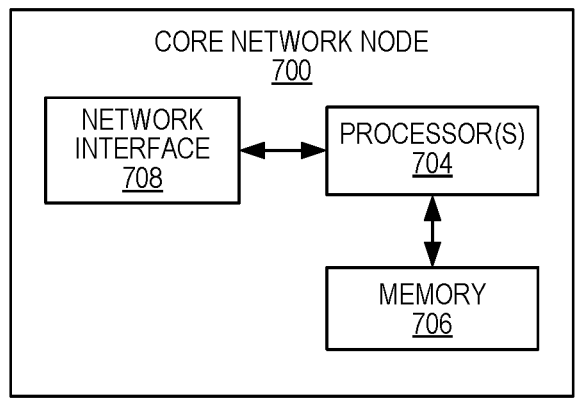
FIGS. 7 through 9 are schematic block diagrams of a core network node that implements an AMF, NF, or NSSF in accordance with embodiments of the present disclosure.

FIG. 7 is a schematic block diagram of a core network node 700 according to some embodiments of the present disclosure. Optional features are represented by dashed boxes. The core network node 700 may be, for example, a network node that implements all or part of the functionality of an NF, AMF, NSSF, or the like, as described above. As illustrated, the core network node 700 includes one or more processors 704 (e.g., Central Processing Units (CPUs), Application Specific Integrated Circuits (ASICs), Field Programmable Gate Arrays (FPGAs), and/or the like), memory 706, and a network interface 708. The one or more processors 704 are also referred to herein as processing circuitry. The one or more processors 704 operate to provide one or more functions of the core network node 700 (e.g., one or more functions of an AMF, NF, or NSSF) as described herein. In some embodiments, the function(s) are implemented in software that is stored, e.g., in the memory 706 and executed by the one or more processors 704.

Figure 8:
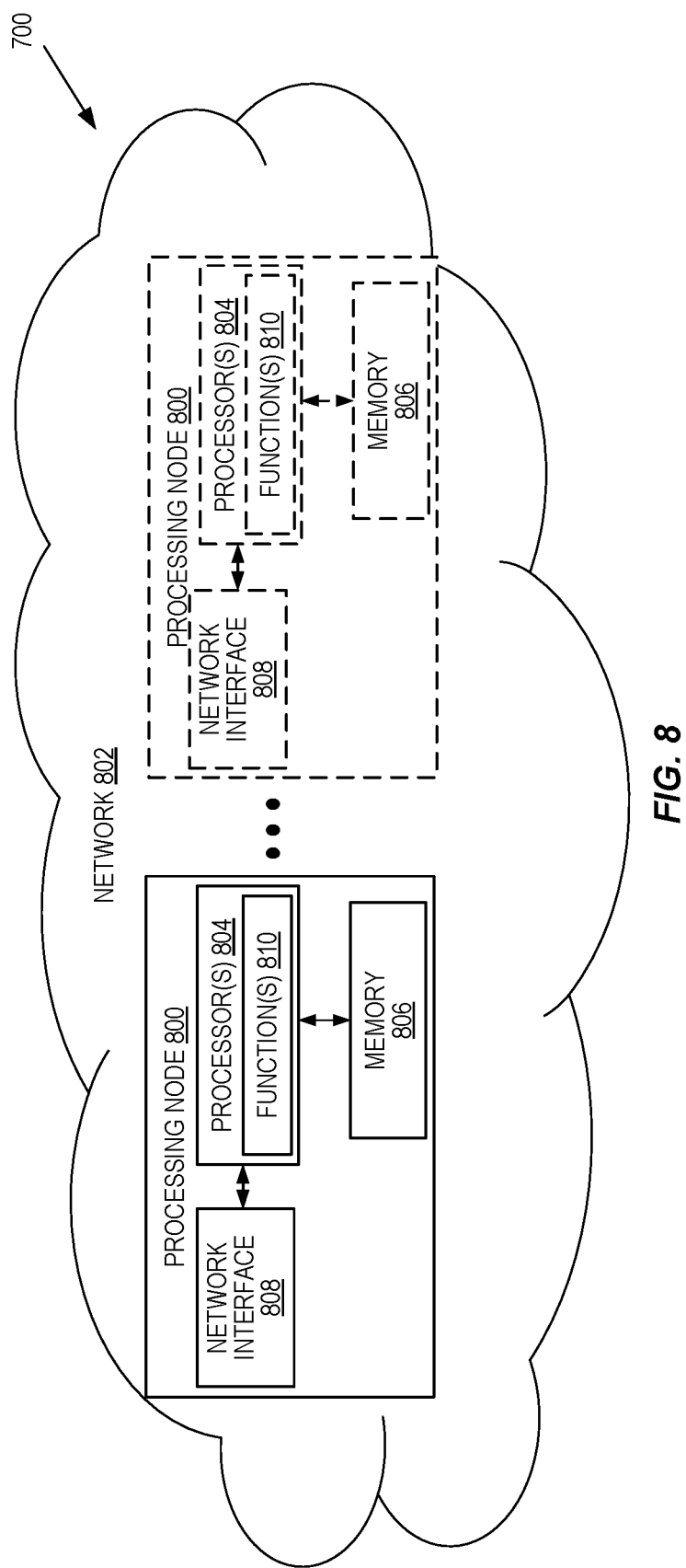

FIG. 8 is a schematic block diagram that illustrates a virtualized embodiment of the core network node 700 according to some embodiments of the present disclosure. As used herein, a "virtualized" core network node is an implementation of the core network node 700 in which at least a portion of the functionality of the core network node 700 (e.g., one or more functions of an AMF, NF, or NSSF) is implemented as a virtual component(s) (e.g., via a virtual machine(s) executing on a physical processing node(s) in a network(s)). As illustrated, in this example, the core network node 700 includes one or more processing nodes 800 coupled to or included as part of a network(s) 802. Each processing node 800 includes one or more processors 804 (e.g., CPUs, ASICs, FPGAS, and/or the like), memory 806, and a network interface 808. In this example, functions 810 of the core network node 700 described herein (e.g., one or more functions of an AMF, NF, or NSSF) are implemented at the one or more processing nodes 800 or distributed across the one or more processing nodes 800 in any desired manner. In some particular embodiments, some or all of the functions 810 of the core network node 700 described herein (e.g., one or more functions of an AMF, NF, or NSSF) are implemented as virtual components executed by one or more virtual machines implemented in a virtual environment(s) hosted by the processing node(s) 800.

In some embodiments, a computer program including instructions which, when executed by at least one processor, causes the at least one processor to carry out the functionality of the core network node 700 or a node (e.g., a processing node 800) implementing one or more of the functions 810 of the core network node 700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
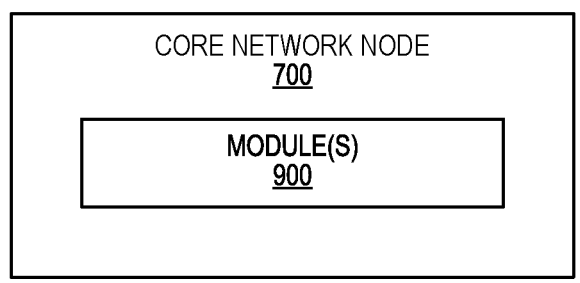

FIG. 9 is a schematic block diagram of the core network node 700 according to some other embodiments of the present disclosure. The core network node 700 includes one or more modules 900, each of which is implemented in software. The module(s) 900 provide the functionality of the core network node 700 described herein (e.g., one or more functions of an AMF, NF, or NSSF). This discussion is equally applicable to the processing node 800 of FIG. 8 where the modules 900 may be implemented at one of the processing nodes 800 or distributed across multiple processing nodes 800.

Figure 10:
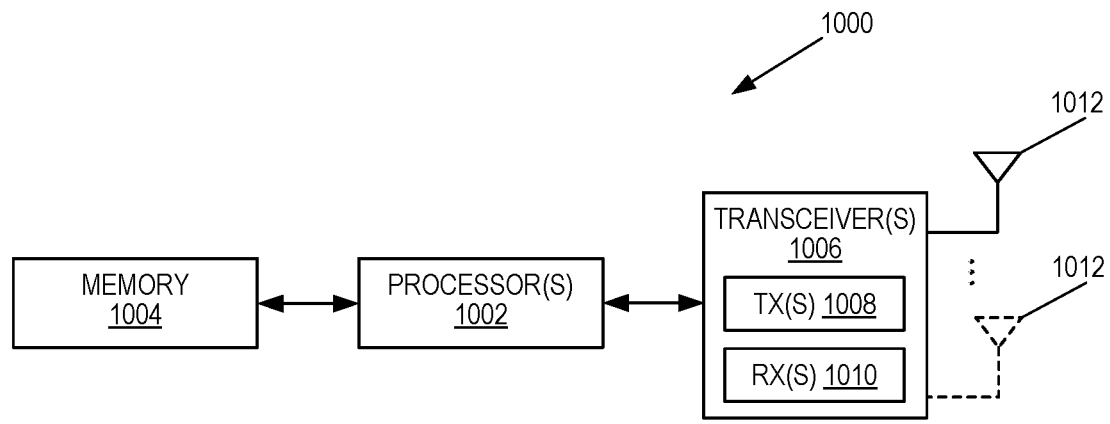
FIGS. 10 and 11 are schematic block diagrams of example embodiments of a UE.

FIG. 10 is a schematic block diagram of a wireless communication device 1000 according to some embodiments of the present disclosure. As illustrated, the wireless communication device 1000 includes one or more processors 1002 (e.g., CPUs, ASICS, FPGAs, and/or the like), memory 1004, and one or more transceivers 1006 each including one or more transmitters 1008 and one or more receivers 1010 coupled to one or more antennas 1012. The transceiver(s) 1006 includes radio-front end circuitry connected to the antenna(s) 1012 that is configured to condition signals communicated between the antenna(s) 1012 and the processor(s) 1002, as will be appreciated by on of ordinary skill in the art. The processors 1002 are also referred to herein as processing circuitry. The transceivers 1006 are also referred to herein as radio circuitry. In some embodiments, the functionality of the wireless communication device 1000 described above (e.g., one or more functions of UE as described herein) may be fully or partially implemented in software that is, e.g., stored in the memory 1004 and executed by the processor(s) 1002. Note that the wireless communication device 1000 may include additional components not illustrated in FIG. 10 such as, e.g., one or more user interface components (e.g., an input/output interface including a display, buttons, a touch screen, a microphone, a speaker(s), and/or the like and/or any other components for allowing input of information into the wireless communication device 1000 and/or allowing output of information from the wireless communication device 1000), a power supply (e.g., a battery and associated power circuitry), etc.

In some embodiments, a computer program including instructions which, when executed by at least one processor, causes the at least one processor to carry out the functionality of the wireless communication device 1000 according to any of the embodiments described herein (e.g., one or more functions of UE as described herein) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
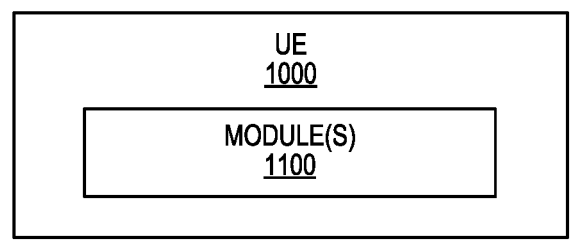

FIG. 11 is a schematic block diagram of the wireless communication device 1000 according to some other embodiments of the present disclosure. The wireless communication device 1000 includes one or more modules 1100, each of which is implemented in software. The module(s) 1100 provide the functionality of the wireless communication device 1000 described herein (e.g., one or more functions of UE as described herein).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method performed by an Access and Mobility Management Function, AMF, in a core network of a cellular communications system, comprising:
  receiving (FIG. 5, step 1) a registration request from a User Equipment, UE;
  responsive to receiving (FIG. 5, step 1) the registration request from the UE:
    initiating (FIG. 5, step 2) a registration procedure; and
    determining (FIG. 5, step 2) whether the registration request received from the UE is applicable for update of counting for a respective network slice to be used by the UE;
  sending (FIG. 5, step 3), to a Network Function, NF, that maintains a count of a number of UEs that are using the respective network slice, a message that initiates a counting procedure that updates the count of the number of UEs that are using the respective network slice.

Embodiment 2: The method of embodiment 1 further comprising obtaining (FIG. 5, steps 2a and 2b) a customer ID for the UE or for an applicable subscribed S-NSSAI associated with the respective network slice to be used by the UE, wherein the customer ID is comprised in the message sent to the NF.

Embodiment 3: The method of embodiment 1 or 2 wherein determining (FIG. 5, step 2) whether the registration request received from the UE is applicable for update of counting for the respective network slice to be used by the UE comprises determining (FIG. 5, step 2) that the registration request received from the UE is applicable for update of counting for the respective network slice to be used by the UE, and the message sent to the NF that initiates the counting procedure comprises information that indicates the respective network slice to be used by the UE.

Embodiment 3A: The method of embodiment 3 wherein the message further comprises information that indicates one or more old allowed network slices of the UE.

Embodiment 4: The method of embodiment 3 or 3A wherein the message further comprises a HPLMN S-NSSAI value that is mapped to the respective network slice to be used by the UE.

Embodiment 5: The method of embodiment 3, 3A, or 4 wherein the respective count for the number of UEs for the respective network slice is incremented responsive to the registration request received from the UE being applicable for update of counting for the respective network slice to be used by the UE.

Embodiment 6: The method of embodiment 1 or 2 wherein determining (FIG. 5, step 2) whether the registration request received from the UE is applicable for update of counting for the respective network slice to be used by the UE comprises determining (FIG. 5, step 2) that the registration request received from the UE is not applicable for update of counting for the respective network slice to be used by the UE, and message sent to the NF that initiates the counting procedure comprises: information (e.g., requested NSSAI or new allowed NSSAI) that indicates the respective network slice to be used by the UE; and information (e.g., old allowed NSSAI) that indicates one or more old allowed network slices of the UE.

Embodiment 7: The method of embodiment 6 wherein the message further comprises: a HPLMN S-NSSAI value that is mapped to the respective network slice to be used by the UE; and one or more HPLMN S-NSSAI value that are mapped to the one or more old allowed network slices of the UE, respectively.

Embodiment 8: The method of embodiment 6 or 7 wherein the respective count is incremented if the respective network slice to be used by the UE is not the same network slice as any of the one or more old allowed network slices of the UE.

Embodiment 9: The method of any one of embodiments 6 to 8 wherein a respective count of the number of UEs for one of the one or more old allowed network slices of the UE is decremented if the one of the one or more old allowed network slices of the UE is not the same as any of one or more requested or newly allowed network slices to be used by the UE, wherein the one or more requested or newly allowed network slices to be used by the UE comprises the respective network slice to be used by the UE.

Embodiment 10: The method of any one of embodiments 1 to 9 further comprising providing (FIG. 5, step 3), to the NF, information that indicates a location of the UE (e.g., current tracking area) and information that indicates an old location of the UE (e.g., old registration area).

Embodiment 10A: The method of embodiment 10 wherein whether a count of the number of UEs using the respective network slice is either incremented or decremented based on the location of the UE and the old location of the UE.

Embodiment 11: The method of embodiment 10 or 10A further comprising receiving (FIG. 5, step 5), from the NF, a list of candidate tracking areas for a new registration area without tracking areas from different network slice service areas.

Embodiment 12: The method of any one of embodiments 1 to 11 wherein different customers are assigned different S-NSSAIS.

Embodiment 13: The method of any one of embodiments 1 to 11 wherein different customers are assigned different IDs that are provided to the NF that performs the counting.

Embodiment 14: A method performed by a Network Function, NF, in a core network of a cellular communications system, comprising:
  receiving (FIG. 5, step 3; FIG. 6, step 3) a message from an Access and Mobility Management Function, AMF, wherein the message comprises:
    information (e.g., requested NSSAI(s) or new allowed NSSAI(s)) that indicates a new network slice(s) to be used by a UE; and
  updating (FIG. 5, step 4; FIG. 6, step 4) a count(s) of a number of UEs that are using the new network slice(s) to be used by the UE.

Embodiment 15: The method of embodiment 14 wherein the message further comprises a customer ID for the UE or for an applicable subscribed S-NSSAI(s) associated with the new network slice(s) to be used by the UE.

Embodiment 16: The method of embodiment 14 or 15 wherein the message further comprises a HPLMN S-NSSAI value(s) that is mapped to the respective network slice(s) to be used by the UE.

Embodiment 17: The method of any one of embodiments 14 to 16 wherein a registration request from the UE is applicable for update of counting for the respective network slice(s) to be used by the UE, and updating (FIG. 5, step 4; FIG. 6, step 4) the count(s) of the number of UEs that are using the new network slice(s) to be used by the UE comprises incrementing the count(s) of the number of UEs that are using the new network slice(s) to be used by the UE.

Embodiment 18: The method of embodiment 14 or 15 wherein a registration request from the UE is applicable for update of counting for the respective network slice(s) to be used by the UE, and message further comprises: information (e.g., old allowed NSSAI(s)) that indicates one or more old allowed network slices of the UE.

Embodiment 19: The method of embodiment 18 wherein the message further comprises: a HPLMN S-NSSAI value(s) that is mapped to the respective network slice(s) to be used by the UE; and one or more HPLMN S-NSSAI values that are mapped to the one or more old allowed network slices of the UE, respectively.

Embodiment 20: The method of embodiment 18 or 19 wherein updating (FIG. 5, step 4; FIG. 6, step 4) the count of the number of UEs that are using the new network slice(s) to be used by the UE comprises incrementing the count of the number of UEs that are using the new network slice(s) to be used by the UE if the respective network slice(s) to be used by the UE is not the same network slice as any of the one or more old allowed network slices of the UE.

Embodiment 21: The method of any one of embodiments 18 to 20 further comprising decrementing (FIG. 5, step 4; FIG. 6, step 4) a count of a number of UEs for one of the one or more old allowed network slices of the UE if the one of the one or more old allowed network slices of the UE is not the same as any of the new network slice(s) to be used by the UE.

Embodiment 22: The method of any one of embodiments 14 to 21 further comprising receiving (FIG. 5, step 3; FIG. 6, step 3), from the AMF, information that indicates a location of the UE (e.g., current tracking area) and information that indicates an old location of the UE (e.g., old registration area).

Embodiment 22A: The method of embodiment 22 wherein whether a count of the number of UEs using the respective network slice(s) is either incremented or decremented based on the location of the UE and the old location of the UE.

Embodiment 23: The method of embodiment 22 further comprising sending (FIG. 5, step 5; FIG. 6, step 5), to the AMF, a list of candidate tracking areas for a new registration area without tracking areas from different network slice service areas.

Embodiment 24: The method of any one of embodiments 14 to 23 wherein different customers are assigned different S-NSSAIs.

Embodiment 25: The method of any one of embodiments 14 to 23 wherein different customers are assigned different IDs that are provided to the NF that performs the counting.

Embodiment 26: The method of any one of embodiments 14 to 25 wherein the NF is an NF other than the AMF or an NSSF.

Embodiment 27: The method of any one of embodiments 14 to 25 wherein the NF is an NSSF.

Embodiment 28: A Network Function, NF, for a core network of a cellular communications system, the NF adapted to perform the method of any one of embodiments 1 to 27.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5G-GUTI Fifth Generation Global Unique Temporary Identifier
5GS Fifth Generation System
Ack Acknowledgement
AF Application Function
AMF Access and Mobility Management Function
AN Access Network
ASIC Application Specific Integrated Circuit
AUSF Authentication Server Function
CPU Central Processing Unit DN Data Network
DSP Digital Signal Processor
eNB Enhanced or Evolved Node B
EPC Evolved Packet Core
EPS Evolved Packet System
E-UTRAN Evolved Universal Terrestrial Radio Access Network
FPGA Field Programmable Gate Array
gNB New Radio Base Station
gNB-CU New Radio Base Station Central Unit
gNB-DU New Radio Base Station Distributed Unit
GSMA Global System for Mobile Communications Association
HPLMN Home Public Land Mobile Network
HSS Home Subscriber Server
ID Identity
IoT Internet of Things
IP Internet Protocol
LTE Long Term Evolution
MME Mobility Management Entity
MTC Machine Type Communication
NEF Network Exposure Function
NF Network Function
NG Next Generation
NR New Radio
NRF Network Function Repository Function
NSSAI Network Slice Selection Assistance Information
NSSF Network Slice Selection Function
O&M Operation and Maintenance
PC Personal Computer
PCF Policy Control Function
PDU Protocol Data Unit
P-GW Packet Data Network Gateway
PLMN Public Land Mobile Network
PRD Permanent Reference Document
QoS Quality of Service
RA Registration Area
RAM Random Access Memory
RAN Radio Access Network
ROM Read Only Memory
RRH Remote Radio Head
RTT Round Trip Time
SCEF Service Capability Exposure Function
SD Slice Differentiator
SMF Session Management Function
S-NSSAI Single Network Slice Selection Assistance Information
SST Slice Service Type
SUPI Subscriber Permanent Identifier
TA Tracking Area
TR Technical Report
TS Technical Specification
UDM Unified Data Management
UE User Equipment
UPF User Plane Function
VPLMN Visited Public Land Mobile Network Those skilled in the art will recognize improvements and modifications to the embodiments of the present disclosure. All such improvements and modifications are considered within the scope of the concepts disclosed herein.

The invention claimed is:

1. A method performed by an Access and Mobility Management Function, AMF, in a core network of a cellular communications system, comprising:
   receiving a registration request from a User Equipment, UE;
   responsive to receiving the registration request from the UE:
      initiating a registration procedure; and
      determining whether the registration request received from the UE is applicable for update of counting for a respective network slice to be used by the UE;
   sending, to a Network Function, NF, that maintains a count of a number of UEs that are using the respective network slice, a message which comprises information that indicates a location of the UE, and which message causes an update to the count of the number of UEs that are using the respective network slice; and
   receiving, from the NF, a list of candidate tracking areas for a new registration area without tracking areas from different network slice service areas.

2. The method of claim 1 wherein determining whether the registration request received from the UE is applicable for update of the counting for the respective network slice to be used by the UE comprises determining whether the UE has already been counted with respect to the respective network slice.

3. The method of claim 1 wherein determining whether the registration request received from the UE is applicable for update of the counting for the respective network slice to be used by the UE comprises:
   determining whether the UE is a new entrant to the cellular communications system,
   determining whether the UE is re-entering the cellular communications system after being in another cellular communications system where count per network slice is decreased in the other cellular communications system when a UE leaves the other cellular communications system, or
   determining whether the UE is registered in the cellular communications system but the respective network slice requested in the registration request is a new network slice for the UE.

4. The method of claim 1 wherein determining whether the registration request received from the UE is applicable for update of the counting for the respective network slice to be used by the UE comprises:
   determining that the registration request received from the UE is applicable for update of the counting for the respective network slice to be used by the UE if the registration request is an Initial Registration request;
   determining that the registration request received from the UE is applicable for update of the counting for the respective network slice to be used by the UE if the UE is coming from an Evolved Packet System, EPS, where the cellular communications system is a Fifth Generation System, 5GS;
   determining that the registration request received from the UE is applicable for update of the counting for the respective network slice to be used by the UE if the UE moved from an area of a same Public Land Mobile Network, PLMN; or
   determining that the registration request received from the UE is applicable for update of the counting for the respective network slice to be used by the UE if one or more network slices are added or removed in the registration request compared to a set of network slices available in a previously allowed set of network slices for the UE.

5. The method of claim 1 wherein the message further comprises information that indicates one or more old allowed network slices of the UE, and a respective count of a number of UEs for one of the one or more old allowed network slices of the UE is decremented if the one of the one or more old allowed network slices of the UE is not the same as any of one or more requested or newly allowed network slices to be used by the UE, wherein the one or more requested or newly allowed network slices to be used by the UE comprises the respective network slice to be used by the UE.

6. The method of claim 1 wherein the information that indicates the location of the UE comprises information that indicates a current tracking area of the UE.

7. The method of claim 1 further comprising providing, to the NF, information that indicates an old location of the UE.

8. The method of claim 1 wherein whether a count of the number of UEs using the respective network slice is either incremented or decremented based on the location of the UE and an old location of the UE.

9. A network node that implements an Access and Mobility Management Function, AMF, for a core network of a cellular communications system, the network node comprising processing circuitry configured to cause the network node to:
receive a registration request from a User Equipment, UE;
responsive to receiving the registration request from the UE:
initiate a registration procedure; and
determine whether the registration request received from the UE is applicable for update of counting for a respective network slice to be used by the UE;
send, to a Network Function, NF, that maintains a count of a number of UEs that are using the respective network slice, a message which comprises information that indicates a location of the UE, and which message causes an update to the count of the number of UEs that are using the respective network slice; and
receive, from the NF, a list of candidate tracking areas for a new registration area without tracking areas from different network slice service areas.

10. The network node of claim 9 wherein, in order to determine whether the registration request received from the UE is applicable for update of the counting for the respective network slice to be used by the UE, the processing circuitry is further configured to cause the network node to determine whether the UE has already been counted with respect to the respective network slice.

11. A method performed by a Network Function, NF, comprising:
receiving a message from an Access and Mobility Management Function, AMF, wherein the message comprises information that indicates a new network slice(s) to be used by a User Equipment, UE, and information that indicates a location of the UE;
updating a count(s) of a number of UEs that are using the new network slice(s) to be used by the UE; and
sending, to the AMF, a list of candidate tracking areas for a new registration area without tracking areas from different network slice service areas.

12. The method of claim 11 wherein a registration request from the UE is applicable for update of the counting for the respective network slice(s) to be used by the UE, and message further comprises:
information that indicates one or more old allowed network slices of the UE.

13. The method of claim 11 further comprising receiving, from the AMF, information that indicates an old location of the UE.

14. The method of claim 11 wherein whether a count of the number of UEs using the respective network slice(s) is either incremented or decremented based on the location of the UE and an old location of the UE.

15. The method of claim 11 wherein the NF is an NF other than the AMF or a Network Slice Selection Function, NSSF.

16. The method of claim 15 further comprising:
determining whether an update of the counting of the new network slice(s) is needed for the UE;
wherein updating the count(s) of the number of UEs that are using the new network slice(s) to be used by the UE is performed responsive to determining that an update of the counting of the new network slice(s) is needed for the UE.

17. A network node that implements a Network Function, NF,
comprising processing circuitry configured to cause the network node to:
receive a message from an Access and Mobility Management Function, AMF, wherein the message comprises information that indicates a new network slice(s) to be used by a User Equipment, UE, and information that indicates a location of the UE;
update a count(s) of a number of UEs that are using the new network slice(s) to be used by the UE; and
send, to the AMF, a list of candidate tracking areas for a new registration area without tracking areas from different network slice service areas.

18. The network node of claim 17 wherein a registration request from the UE is applicable for update of the counting for the respective network slice(s) to be used by the UE, and message further comprises information that indicates one or more old allowed network slices of the UE.

* * * * *